Jan. 11, 1966   H. E. BRYS   3,229,094
RADIATION THICKNESS GAUGE USING MAGNETIC AMPLIFIERS
AND A CONSTANT REFERENCE SOURCE OF VOLTAGE
FOR COMPARISON
Filed Sept. 13, 1962   2 Sheets-Sheet 1

INVENTOR.
HARRY EUGENE BRYS,
BY
ATTORNEYS.

Jan. 11, 1966    H. E. BRYS    3,229,094
RADIATION THICKNESS GAUGE USING MAGNETIC AMPLIFIERS
AND A CONSTANT REFERENCE SOURCE OF VOLTAGE
FOR COMPARISON
Filed Sept. 13, 1962    2 Sheets-Sheet 2

INVENTOR.
HARRY EUGENE BRYS,
BY
ATTORNEYS.

United States Patent Office 3,229,094
Patented Jan. 11, 1966

3,229,094
RADIATION THICKNESS GAUGE USING MAGNETIC AMPLIFIERS AND A CONSTANT REFERENCE SOURCE OF VOLTAGE FOR COMPARISON
Harry Eugene Brys, Butler, Pa., assignor to Armco Steel Corporation, Middletown, Ohio, a corporation of Ohio
Filed Sept. 13, 1962, Ser. No. 223,405
9 Claims. (Cl. 250—83.3)

This invention relates to a radiation thickness gauge. More particularly it relates to a radiation thickness gauge especially designed and of outstanding utility in measuring the thickness of metal strip in rolling mills.

Radiation thickness gauges have been employed in the past because they present the advantage that the gauge is not required to engage the strip. Generally an X-ray generating apparatus is disposed on one side of the strip and an X-ray detection apparatus is disposed on the other side of the strip. In addition to the X-ray tube, most such apparatuses known today require the use of numerous vacuum tubes and/or transistors and such apparatuses have been complex and not too reliable.

With the foregoing considerations in mind, it is an object of the present invention to provide a radiation thickness gauge which will be extremely reliable because it will involve relatively few component parts. It is another object of the invention to provide an apparatus as outlined above which requires no transistors and no moving parts in the detection and read-out systems. What little maintenance may be necessary is greatly simplified by virtue of the small number and simplified arrangement of the components.

Other objects of the invention involve the provision of an apparatus which may easily and positively be standardized, which is extremely accurate and fast in response, which may be adapted to any desired range of measurements, and which involves low impedance circuits.

These and other objects of the invention which will be pointed out in greater detail hereinafter, are accomplished by that certain construction and arrangement of parts of which the following is an exemplary embodiment.

Reference is made to the drawings forming a part hereof and in which.

Briefly, in the practice of the invention, the gauge comprises a source of radiation which may be an X-ray tube capable of adjustment in radiation output so that it may be calibrated for different thicknesses, and which will maintain the adjusted value of radiation throughout the measurement of the unknown thickness. This apparatus in and of itself does not constitute a part of the present invention.

Associated with the radiation source is a detection apparatus which may involve use of a photomultiplier tube and which detector in and of itself does not constitute a part of the present invention. Standards will be provided in association with the generating and detecting apparatus so that the gauge may be calibrated for various thicknesses.

The output of the detecting apparatus is fed to a read-out apparatus wherein the signal from the detecting apparatus is greatly amplified and wherein this amplified signal is fed in bucking relation to an amplified calibration reference current in what may be termed a bridge circuit. Thus, the difference between the current from the detection apparatus and the calibration reference current is an indication of the thickness of the object being measured.

The output from the detection apparatus is also fed to a shutter control apparatus disposed in series with the read-out apparatus. The shutter control apparatus is so arranged that when no objects is in the path of the X-rays, a lead shutter will automatically be placed in front of the X-ray generating apparatus and whereby, if excessive radiation is generated for one reason or another which would be dangerous to personnel in the immediate vicinity, the shutter is automatically closed. The shutter also minimizes fatigue of the detection system components.

Figure 1:
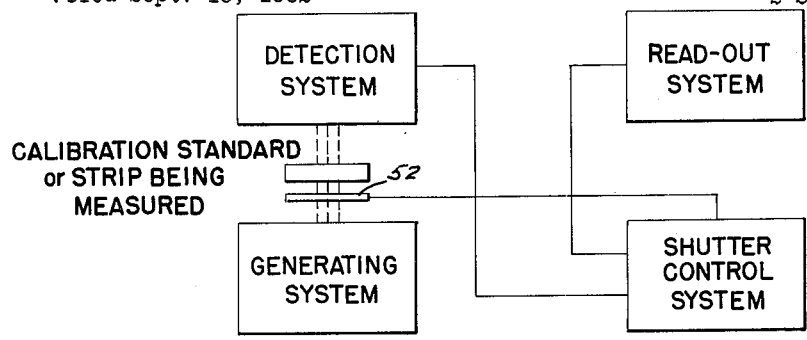
FIG. 1 is a block diagram showing the relationship between the generating, detection, read-out and shutter control apparatuses.

Referring now in more detail to the drawings, the block diagram of FIG. 1 shows the relationship between the various portions of the apparatus. As pointed out above, the generating and detection apparatuses and the standard do not constitute a part of the present invention in and of themselves.

Figure 2:
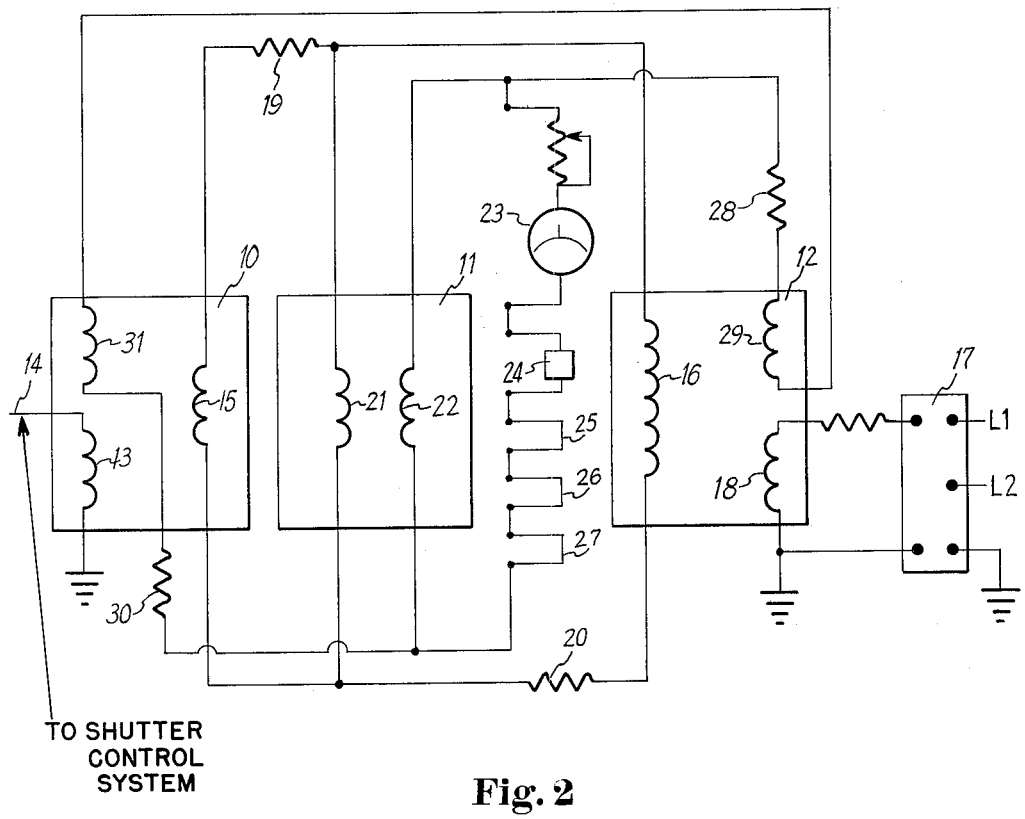
FIG. 2 is a wiring diagram showing the read-out circuit.

Coming now to the read-out circuit, reference is made to FIG. 2. This circuit uses the low level, high gain (current amplified about 10,000 times) magnetic amplifiers 10, 11 and 12 which provide an extremely stable circuit to yield long maintenance free life. The low impedance circuit, in cointrast to vacuum tube read-out systems, eliminates all noise and instability problems. Current from the detection apparatus (considered as conventional current flow, i.e. plus to minus) flows from ground through the input winding 13 and thence through the lead 14, directly or indirectly, to the anode of the photomultiplier tube in the detecting apparatus. This current will be a very small current of the order of 2 microamperes. The current flowing through the winding 13 is amplified in the magnetic amplifier 10 and appears in the output winding 15.

The magnetic amplifier 12 is identical to the magnetic amplifier 10 except that the output of the winding 16 is produced by a very stable reference current of approximately 2 microamperes supplied by a constant voltage power supply of known type indicated in the drawing at 17. The input current is fed to the coil 18.

The output currents of the magnetic amplifiers 10 and 12 are connected in opposition through the current limiting resistors 19 and 20 and applied to the input winding 21 of the magnetic amplifier 11. Thus, the winding 21 is connected as the detector of a bridge circuit. The polarity of the current flowing in the winding 21 will depend upon whether the output of the winding 15 is greater or less than the output of the winding 16. The output of the winding 22 of the magnetic amplifier 11 is of reversible polarity dependent upon the polarity of the input current of the winding 21. It is therefore only necessary to connect across the winding 22 a zero-center meter 23 which will indicate a deviation in thickness as thick or thin, or heavy or light. The apparatus is calibrated or zeroed by varying the anode voltage to the X-ray tube so as to vary the radiation emission through the standard and thereby change the current passing from the detector system through the winding 13 to a value which balances the reference current flowing through the winding 18. This balance is achieved when the meter 23 indicates zero. It will be understood that a recorder may be connected in series with the meter 23 as indicated at 24 and that jumpers 25, 26 and 27 may be provided for additional meters and/or recorders if desired.

It will be noted that the output of the winding 22 of the magnetic amplifier 11 is also fed back to the magnetic amplifier 12 through the resistor 28 so as to flow through the coil 29, and also through the resistor 30 to the winding 31 in the magnetic amplifier 10. This feed-back to the coils 29 and 31 is negative and serves to stabilize the circuit. The feed-back may of course be varied according to requirements and limitations affecting stability and response.

Figure 3:
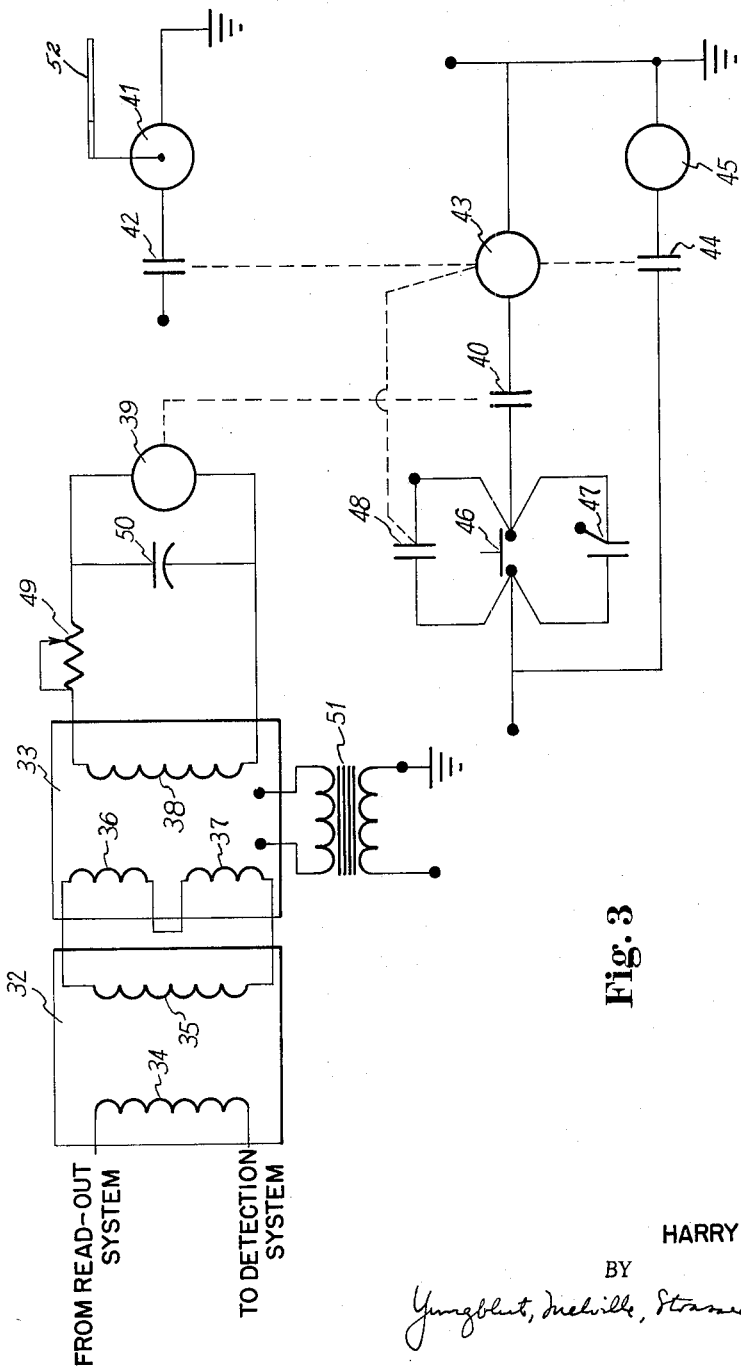
FIG. 3 is a wiring diagram showing the shutter control circuit.

The shutter control circuit is shown in detail in FIG. 3. It is conventional for an X-ray tube to be provided with a lead shutter which should be closed when the radiation level exceeds a safe value to protect the detection apparatus from excess fatigue. The shutter is desirably also closed in order to limit scatter radiation when the gauge is retracted from the strip.

By reference to FIG. 3, it will be seen that there are used the magnetic amplifiers 32 and 33. The current flowing through the coil 34 is preamplified by the amplifier 32 and the output from the coil 35 flows through the input windings 36 and 37 of the magnetic amplifier 33. Actually the device represented at 33 is a relay magnetic amplifier, the output of which from the coil 38 is set to be 24 volts either off or on, depending upon the threshold control of the input windings 36 and 37. This particular circuit is arranged so that a 24 volt D.C. output is produced by the coil 38 when little or no input current is flowing in the coils 36 and 37. While the magnetic amplifiers 10, 11, 12 and 32 will be understood to have a conventional 115 volt A.C. power supply, preferably in common (not shown), the magnetic amplifier 33 is provided with its own separate power supply from the transformer 51 designed to supply about 26 volts to the circuit so as to achieve the 24 volt D.C. output described above. It will be understood that the A.C. input power supply to all of the magnetic amplifiers is rectified internally.

The relay 39 is the shutter control relay which actuates the contacts 40. When a safe value of current is flowing in the input winding 34 of magnetic amplifier 32, the relay 39 is energized and the contacts 40 are closed to enable the shutter circuit to be closed as will now be described. The shutter solenoid is indicated at 41 and is operated by the closing of the contacts 42 produced by operation of the auxiliary shutter relay 43. The solenoid 41 is directly coupled to the lead shutter, diagrammatically shown at 52. The auxiliary relay 43 also actuates the contacts 44 which energize a warning light or signal 45.

It will now be clear that when a safe value of current is flowing in the apparatus and the contacts 40 are closed, the relay 43 may be energized by means of the pushbutton 46 which may be manually actuated by the operator, or alternatively by a track limit switch 47 which is closed momentarily when the gauge is placed in gauging position. At 48 there are indicated hold-in contacts which are closed by auxiliary shutter relay 43.

Thus as long as a safe value of current is flowing in the input winding 34 of the magnetic amplifier 32, the contact 40 is closed. This permits the auxiliary shutter relay 43 to be energized, either by momentary actuation of the push button 46, or by momentary operation of the track limit switch 47. The relay 43 remains energized by the hold-in contacts 48 of the relay 43 until the relay 39 is deenergized. Excessive radiation reaching the detector will cause an excessive current in the winding 34, and such an excessive current deenergizes the relay 39. The point at which the relay 39 is energized or deenergized may be adjusted by means of the potentiometer 49. The capacitor 50 is utilized to filter the direct current from the coil 38.

It will be understood that each of the magnetic amplifiers is provided in a conventional manner with an A.C. power supply (not shown).

It will also be understood that various modifications may be made without departing from the spirit of the invention and that no limitation not expressly set forth in the claims is to be imported into them.

What is claimed is:

1. In an electronic ray gauge for determining the thickness of an object disposed between a ray generating apparatus and a ray detecting apparatus, wherein said detecting apparatus puts out a small detector output current which varies with the amount of radiation reaching said ray detecting apparatus, and thus with the thickness of said object; means for generating a small, substantially constant calibration reference current of the same order of magnitude as said detector output current, magnetic amplifier means for amplifying said small calibration reference current, magnetic amplifier means for amplifying said small detector output current, electric circuit means for feeding said amplified detector output and calibration reference currents, in opposition, into a third magnetic amplifying device, the amplified output of said third magnetic amplifying device varying with the difference between said amplified detector output and calibration reference currents, and therefore with the thickness of said object, and an electric circuit means including an indicating device for indicating said thickness.

2. A device according to claim 1, wherein electric circuit means are provided for feeding the output of said third magnetic amplifying device back to the two first mentioned magnetic amplifying devices for circuit stabilization.

3. A device according to claim 1, wherein said reference current generating means is a constant voltage power supply.

4. In an electronic ray gauge for determining the thickness of an object disposed between a ray generating apparatus and a ray detecting apparatus, wherein said detecting apparatus puts out a small detector output current which varies with the amount of radiation reaching said ray detecting apparatus, and thus with the thickness of said object; means for generating a small, substantially constant calibration reference current of the same order of magnitude as said detector output current, magnetic amplifier means for amplifying said small calibration reference current, magnetic amplifier means for amplifying said small detector output current, electric circuit means for feeding said amplified detector output and calibration reference currents, in opposition, into a third magnetic amplifying device, the amplified output of said third magnetic amplifying device varying with the difference between said amplified detector output and calibration reference currents, and therefore with the thickness of said object, and an electric circuit means including an indicating device for indicating said thickness, said detector output and calibration reference current magnetic amplifying means having output windings, and said third magnetic amplifying device having an input winding, said input winding serving as a detector in a bridge circuit between said output windings.

5. In an electronic ray gauge for determining the thickness of an object disposed between a ray generating apparatus and a ray detecting apparatus, wherein said detecting apparatus puts out a small detector output current which varies with the amount of radiation reaching said ray detecting apparatus, and thus with the thickness of said object, said ray generating apparatus including a normally closed shutter; amplifying means for said detector output current, a relay magnetic amplifier having a threshold control for the input thereto, said relay magnetic amplifier putting out a predetermined voltage until the said threshold is exceeded, and when said threshold is exceeded, shutting off said predetermined voltage, means for applying the said amplified detector output current to the input of said relay magnetic amplifier, means to hold said shutter open, said last named means being energized by said predetermined voltage, whereby when excessive radiation produces an excessive detector output current, said threshold control operates to shut off said predetermined voltage to cause said shutter to close.

6. A device according to claim 5, wherein the means to hold said shutter open includes a solenoid and a relay for actuating said solenoid, an electric circuit means including said last named relay and an enabling contact, and having a plurality of parallel means for completing said circuit means, said enabling contact being actuated by said relay magnetic amplifier, whereby when a safe value of radiation is being maintained, said shutter may be opened by any one of said parallel means, and if said safe value is exceeded said shutter will be closed.

7. A device according to claim 6, wherein one of said parallel means is manually actuated.

8. In an electronic ray gauge for determining the thickness of an object disposed between a ray generating apparatus and a ray detecting apparatus, wherein said detecting apparatus puts out a small detector output current which varies with the thickness of said object, said ray generating apparatus including a normally closed shutter; a read-out apparatus and a shutter control apparatus, each having an input, the inputs of said apparatuses being connected in series with the output of said detecting apparatus to feed said small detector output current to the inputs of said read-out apparatus and shutter control apparatus, means in said read-out apparatus for generating a small, substantially constant calibration reference current of the same order of magnitude as said detector output current, means for amplifying said detector output current, means for amplifying said calibration reference current, electric circuit means for feeding said amplified detector output and calibration reference currents, in opposition, into a third amplifying device, the amplified output of said third amplifying device varying with the difference between said amplified detector output and calibration reference currents, and therefore with the thickness of said object, an electric circuit means including an indicating device for indicating said thickness, and means in said shutter control apparatus to open said shutter, and means in said shutter control apparatus to cause said shutter to close in the event of an excessive detector output current produced by excessive radiation picked up by said detecting apparatus.

9. In an electronic ray gauge for determining the thickness of an object disposed between a ray generating apparatus and a ray detecting apparatus, wherein said detecting apparatus puts out a small detector output current which varies with the thickness of said object, said ray generating apparatus including a normally closed shutter; a read-out apparatus and a shutter control apparatus, each having an input, the inputs of said apparatuses being connected in series with the output of said detecting apparatus to feed said small detector output current to the inputs of said read-out apparatus and shutter control apparatus, means in said read-out apparatus for giving an indication based on the value of said detector output current, means in said shutter control apparatus for amplifying said detector output current, a relay magnetic amplifier having a threshold control for the output thereof, said relay magnetic amplifier putting out a predetermined voltage until the said threshold is exceeded, and when said threshold is exceeded, shutting off said predetermined voltage, means for applying the said amplified detector output current to the input of said relay magnetic amplifier, means to hold said shutter open, said last named means being energized by said predetermined voltage, whereby when excessive radiation produces an excessive detector output current, said threshold control operates to shut off said predetermined voltage to cause said shutter to close.

References Cited by the Examiner
UNITED STATES PATENTS

| | | | |
|---|---|---|---|
| 2,659,015 | 11/1953 | Lee | 250—105 |
| 2,700,759 | 1/1955 | Ogle | 323—89 |
| 2,742,150 | 4/1956 | Rendel | 250—83.3 |
| 2,856,539 | 10/1959 | Orthuber | 250—105 |
| 2,956,167 | 10/1960 | Cushman | 250—83.3 |
| 3,012,140 | 12/1961 | Pellissier | 250—51 |

OTHER REFERENCES

Magnetic Amplifiers—Circuits, Characteristics and Applications, Vickers Electric Division of The Sperry Corp., Bulletin No. VT 2000, 1948, pages 1 to 7.

RALPH G. NILSON, *Primary Examiner.*

JAMES W. LAWRENCE, *Examiner.*